United States Patent Office 3,150,041
Patented Sept. 22, 1964

---

3,150,041
AMINO-SUBSTITUTED HETEROCYCLIC NITROGEN COMPOUNDS AS BIRD MANAGEMENT CHEMICALS
Lyle D. Goodhue, Andrew J. Reinert, and Ralph P. Williams, Bartlesville, Okla., assignors to Phillips Petroleum Company, a corporation of Delaware
No Drawing. Filed Oct. 8, 1962, Ser. No. 229,155
14 Claims. (Cl. 167—46)

This invention relates to the control of birds. In one of its aspects this invention relates to a method for clearing an area of birds. In another of its aspects, this invention relates to bird management compositions.

This is a continuation-in-part application of copending application having Serial No. 152,005, filed November 13, 1961, now Patent No. 3,113,072.

The control of birds is one of the major problems confronting farmers and city managers at this time. For instance, the loss of grain and seed by bird consumption represents considerable financial losses to farmers each year. Cities frequently spend many thousands of dollars a year in an attempt to drive away birds and thus prevent the defacing of buildings and the like. Furthermore, there have been several airplane crashes attributed to flocks of birds circling in the landing pattern and near the ends of airport or airfield runways. Also, birds cause further difficulties by aiding in the transmission of various livestock diseases, many of which cause the loss of livestock valued in the millions of dollars each year.

Various means have been employed to scare or otherwise drive birds away from certain localities. For example, scarecrows have been used for many years by farmers in grain fields or other areas, although this method has actually met with little success. More modern versions of the scarecrow, such as artificial owls and the like, have also met with little success. Certain types of noisemakers such as sirens and the like have likewise been used. Still more recently, chemical repellents have been developed which, to some extent, alleviate the problem.

This invention relates to novel bird control compositions and to a method for clearing an area of birds by subjecting birds within said area to the action of certain heterocyclic nitrogen-containing compounds.

Accordingly, an object of this invention is to provide novel bird management compositions.

Another object of this invention is to provide an effective method for clearing an area of birds.

A further object of this invention is to provide novel compositions and a method for protecting property from birds, especially materials normally consumed as food by birds.

Other aspects, objects and the several advantages of this invention will be apparent from a study of this disclosure and the appended claims.

According to the present invention, it has been found that the activity of birds can be controlled by subjecting birds to the action of an effective amount of a heterocyclic nitrogen-containing compound having a structural formula selected from

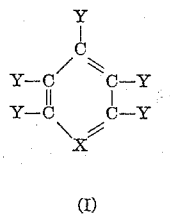
(I)

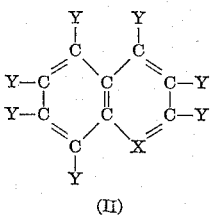
(II)

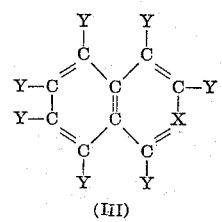
(III)

wherein (1) X is selected from the group consisting of

—N= and

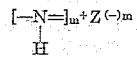

(2) $n$ is an integer selected from the group consisting of 0, 1 and 2,
(3) Y is selected from the group consisting of R,

and

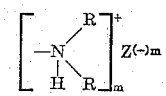

and at least one Y is selected from the group consisting of

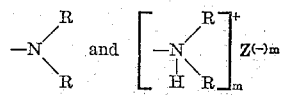

(4) R is selected from the group consisting of hydrogen, methyl and ethyl radicals,
(5) Z is an anion of an acid selected from the group consisting of mono-, di- and trivalent inorganic and organic acids,
(6) $m$ is an integer selected from the group consisting of 1, 2 and 3 and is equal to the valence of the anion Z,
(7) when Z is an anion of a di- or trivalent acid, the multiple monovalent cationic groups can be located on the same or different molecules, and
(8) when X is

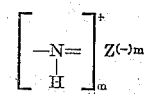

and Y is

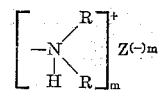

Y is located in the 3 position with respect to the X group.

The compounds of Formula I, above, are preferred, and it is preferred that only one of said Y groups be

It is also preferred that said R groups on the

group be hydrogen. Furthermore, it is preferred that not more than one of said Y groups be alkyl. As to position, it is preferred that said

group be located in the 4-position and if one of said Y groups is alkyl, it is preferred that said alkyl group be located in the 3-position. It is further preferred to employ the salts as defined, when treating grain to avoid an odor and discoloration problem often encountered with grain treated with aminopyridines. Moreover, the salts of the amines are non-volatile at ordinary temperatures and, therefore, are much more durable and long lasting than the free bases. Also, the free amines are less stable than the salts to oxidation.

Some examples of anions which are represented by Z in the above general formulae are chloride, bromide, iodide, fluoride, nitrate, sulfate, phosphate, nitrite, acetate, propionate, butyrate, oxalate, malonate, succinate, tartrate, phthalate, benzoate, citrate and the like.

Representative and specific heterocyclic nitrogen-containing compounds of the above described general structural formulae that can be employed according to the practice of the present invention include:

4-aminopyridine
4-aminopyridine-N-oxide
4-amino-3-methylpyridine
4-amino-3-methylpyridine-N-oxide
4-(N-methylamino)pyridine-N-oxide
4-(N,N-dimethylamino)pyridine-N-oxide
3-aminopyridine
3-aminopyridine-N-oxide
2-aminopyridine
2,6-diaminopyridine
4-amino-2-methylpyridine-N-oxide
4-amino-2,6-dimethylpyridine
3-amino-2,4,6-trimethylpyridine
4-amino-2-methylquinoline
4-amino-2-methylquinoline-N-oxide dihydrate
3-amino-2-ethylpyridine-N-oxide
4-aminoquinoline
4-aminoquinoline-N-oxide
4-amino-2,3-dimethylquinoline-N-oxide monohydrate
4-amino-2,6-dimethylquinoline
2,8-diaminoquinoline
3-aminoisoquinoline
3-amino-1-methylisoquinoline-N-oxide
4-amino-2-methyl-5-ethylpyridine
4-amino-2,3,5,6-tetramethylpyridine-N-oxide
4-(N,N-diethylamino)-2,3,5,6-tetraethylpyridine-N-oxide
4-amino-2,3,5,6,7,8-hexaethylquinoline-N-oxide dihydrate
4-aminopyridinium chloride
4-pyridylammonium chloride
4-aminopyridine-N-oxide hydrochloride
3-aminopyridine dihydrochloride
Di(4-aminopyridinium) tartrate
Di(4-aminopyridinium) sulfate
2-aminopyridinium bromide
3-amino-2,6-dimethylpyridine dihydrochloride
4-amino-2,6-dimethylpyridinium propionate
4-(N,N-dimethylamino) pyridine-N-oxide hydroiodide
4-aminoquinolinium fluoride
3-amino-2-ethylpyridinium nitrate
Tri(4-amino-2-methyl-5-ethylpyridinium) phosphate
3-aminoisoquinolinium nitrite
4-aminopyridinium butyrate
4-aminopyridinium benzoate
Di(3-amino-2-methylpyridinium) phthalate
Di(4-amino-2,3,6-trimethylpyridinium) oxalate
Di(3-aminoquinolinium) malonate
Di(4-pyridylammonium) succinate
Tri(4-aminopyridinium) citrate, di(3-aminopyridinium) tartrate
Di(3-aminopyridinium) fumarate and the like.

The preferred compounds are the salts particularly the chlorides and sulfates of aminopyridines. The most preferred single compound is the monohydrochloride of 4-aminopyridine, the salt ordinarily being attached to the pyridine nitrogen. This compound could thus be named as 4-aminopyridinium chloride (4-aminopyridine hydrochloride).

Many of the compounds of the invention can be purchased from commercial sources, but not all are available. Synthesis of these compounds can be effected by conventional techniques. Some typical methods follow. For example, one can proceed in the synthesis of these compounds by first forming the N-oxide. Generally, one mole of pyridine is reacted with one mole (+5% excess) of hydrogen peroxide which is charged as 30 percent aqueous $H_2O_2$. Acetic acid is used as the diluent and is present at a 4/1 molar ratio of acetic acid to pyridine. The acetic acid also serves as the oxygen carrier, forming peracetic acid in situ. The conditions for the reaction are approximately 85° C. for 10 hours.

After the N-oxide such as pyridine-N-oxide is formed, it is usually most convenient to nitrate, as for example to form 4-nitropyridine-N-oxide. This can be carried out by conventional nitration procedures using a typical molar ratio of pyridine-N-oxide/$HNO_3$/$H_2SO_4$ of 1/30–3.5/3.5–7.0. Nitration of the N-oxide is necessary to obtain the ratio group in the 4-position.

After the nitrated N-oxide such as 4-nitropyridine-N-oxide is formed, one can proceed by several methods to form the bird management chemicals of this invention. Reduction of 4-nitropyridine-N-oxide under rather severe conditions will simultaneously reduce the nitro group to an amino group and remove the oxide group. For example, treatment of 4-nitropyridine-N-oxide with hydrogen at about 500 p.s.i. and 100° C. in water or alcohol and in the presence of 1 percent by weight based on the N-oxide of 10 percent palladium on charcoal catalyst will yield 4-aminopyridine. However, if the same catalyst is used at milder conditions, say 60 p.s.i. and 30–40° C., 4-aminopyridine-N-oxide is obtained. Synthesis of 4-dimethylaminopyridine-N-oxide can be effected by treating 4-nitropyridine-N-oxide with acetyl chloride to form 4-chloropyridine-N-oxide. This compound can then be reacted with dimethylamine to form 4-dimethylaminopyridine-N-oxide. Similar reactions can be employed to form the other compounds which contain, for example, such substituent groups as alkyl radicals. Similarly, the salts can be formed by reacting an aminopyridine, for example, with an inorganic acid or organic acid under suitable reaction conditions.

It has been found that the various compounds disclosed above are effective "bird management" agents. Birds that have eaten even a very small amount of these "bird management" agents are unable to fly for some time and during this period of time (inability to fly) the birds undergo convulsions, emit warning or distress cries to other birds, and the like. It is not known definitely by what mechanism these warning cries or convulsive actions serve to drive other birds away from affected birds but, as shown by the specific examples hereinbelow, the compounds of the invention are extremely effective for clearing birds from an area after at least one of the birds has been subjected to the action of one of the compounds of the invention.

Ingestion of a sufficient amount of at least one of the compounds of the invention defined above by one or more birds produces symptoms such as tremors, loss of flight, fluttering, paralysis, and warning and distress cries. The result is that other birds, upon seeing birds having convulsions or suffering from paralysis, and hearing the distress cries emitted by affected birds, even entire flocks of birds, will leave an area and stay away from the area for long periods of time.

The compositions of the invention are also useful as avicides. The amount of heterocyclic nitrogen-containing compound ingested by a bird required to cause death will vary depending upon the particular compound employed, the species of bird, as well as other factors. Ordinarily, bird food treated with at least 1 weight percent of one or more of the compounds of the invention produces a treated material or food, when ingested by a bird, effective as an avicide since the mortality rate at the higher concentrations is rather high.

When employing the bird management or anti-flying compounds of this invention to reduce the number of birds in an area, one or more of the birds in the area to be cleared must ingest an effective amount of at least one of the compounds in order to achieve the best results. The active anti-flying compounds can be ingested by the birds by feeding the birds treated food or by injecting a small amount of at least one of the compounds into at least one of the birds' bodies by suitable means. The amount of effective compound ingested by a bird to get the desired effect is generally within the range of 3 to 500 mg. of the active ingredient per kg. of bird weight, usually in the range of 5 to 100 mg./kg. The compounds of the invention can be conveniently given to birds by treating a food normally eaten by the birds and thereafter placing the treated food or bait in the area from which it is desired to clear the birds. For example, grains and seeds such as sorghum, corn kernels, chopped corn, chicken feed, kaffir corn, wheat, oats, barley and the like, can be employed as well as such materials as potatoes, bread and the like. If a grain is used, a convenient method for treating the grain comprises impregnating the grain with a solution of one of the agents and a volatile solvent and thereafter evaporating off the volatile solvent. Acetone-water is a convenient solvent mixture for use in such a method of operation. If, however, bread is used as a bait, inverted emulsions in mayonnaise or other oily material are suitable methods for applying the anti-flying compounds to the bread.

The compounds of the present invention can be applied to bird food, such as grain, for their intended purpose as a concentrate, or in combination with a carrier or other inert materials. Solvent or adjuvant carriers employed should be substantially inert with respect to the active compound. Some examples of specific carrier materials that can be employed are water-acetone, deodorized kerosene, naphthas, isoparaffinic hydrocarbon fractions boiling in the range of about 260 to about 800° F. (Soltrol) and the like. If desired, the bird management compounds of this invention can be applied as aqueous emulsions by employing a suitable emulsifying agent. It is also within the scope of this invention to employ mixtures of the heterocyclic nitrogen-containing compounds and to employ mixtures of one or more of these compounds with other known bird control agents.

Whatever method is employed for treating the bird food, the treated food will generally contain from 0.01 to about 10 percent by weight of the bird management compound, preferably 0.02 to 2 weight percent. The lower percentages will, of course, be used when the more active agents are to be employed, while the higher percentages will be used with the less effective agents. Larger or smaller amounts, however, can be employed, when desired, although larger amounts are generally uneconomical.

In actual operation, birds can be effectively cleared from an area, building, or other locality, with a very minor amount of one of the above-described compounds. It can be seen that by employing small amounts of treated grain, for example, one need not treat the entire area such as would be required if a true repellent material was employed. By operating in this manner, buildings, airport runways, grain fields, and the like, can be cleared of birds and maintained clear of birds for prolonged periods of time. This is particularly advantageous in grain fields since the farmers can place small amounts of treated grain in the fields shortly before the grain ripens, thus clearing the birds from the fields, before they have a chance to eat the crop. After the crop has been harvested, the use of treated bait or bird food can be discontinued. In many instances, it is desirable to first lure the birds into an area with a bait or untreated grain, and then place treated bird food in the area for the birds to consume with the result that affected birds warn and scare other birds away from that particular area.

The following specific examples are intended to illustrate the advantages of the bird management compounds of this invention, but it is not intended to limit the invention to the embodiments shown herein. As discussed above, it has only been specified how much of the active compound to deposit on treated bait. In the following examples, it will be shown that various agents are required in different dosages to obtain the desired symptoms. The amount of active ingredient ingested by a bird needed to obtain the desired results will vary depending upon the compound employed and the species of birds treated. Since one wishing to clear an area of birds by the method of this invention has no control over the amount of treated food that a bird will eat, it is impossible to specify exactly what dose will be applied to birds under actual conditions. However, one method which can be used for selecting between species of birds is the use of different sized grain. For example, sparrows cannot eat whole kernel corn whereas pigeons can eat such food very readily. Thus, if one wishes to clear pigeons from a building or other area where only small populations of sparrows exit, whole corn can be used exclusively.

The following examples illustrate the effectiveness of the compounds of the present invention but are not intended, however, to unduly limit the scope of the invention.

EXAMPLE I

A series of runs was carried out in which a variety of amino-substituted heterocyclic compounds were tested as bird management chemicals.

In these runs, the chemicals to be tested were given orally, by means of a syringe and stomach tube, to chicks 10 to 15 days old. The effect on the chick in each case was noted, and sufficient runs were carried out to determine the $LD_{50}$ for each chemical. $LD_{50}$ is the dose required in mg. of chemical per kg. of bird weight to kill 50 percent of the chicks. Although $LD_{50}$ is not a measure of the value of a chemical as a bird control agent, all of the bird management or control agents which we have found have high toxicity to birds. Thus, when a chemical is noted to produce convulsions, cause distress cries, prevent flying, etc. the $LD_{50}$ provides a good measure of effectiveness when comparing the agent to another compound producing these effects.

The results of the tests are expressed below as Table I.

Table I

| Compound | LD$_{50}$, mg./kg.=X, Aminopyridine-N-oxides | Observed effects |
|---|---|---|
| 4-aminopyridine-N-oxide | 50<X<75 | Convulsions, can't fly, distress calls. |
| 4-amino-3-picoline-N-oxide | 35<X<40 | Do. |
| 4-amino-2-picoline-N-oxide | X>1,000 | Mild shakes. |
| N-methyl-4-aminopyridine-N-oxide | 100<X<300 | Nervous, can't control legs. |
| 4-(N,N-dimethylamino)pyridine-N-oxide | 300<X<500 | Flopping symptoms. |
| 4-amino-2,5-dimethylpyridine-N-oxide | 500<X<1,000 | Droopy. |
| 4-amino-2,6-dimethylpyridine-N-oxide | X>1,000 | No effect at dose used. |
| 3-amino-2,4,6-trimethylpyridine-N-oxide | X>1,000 | Droopy. |

| Compound | LD$_{50}$, mg./kg.=X, Amino-Substituted Heterocyclic Compounds | Observed effects |
|---|---|---|
| 4-aminopyridine | 30<X<40 | Convulsions, can't fly, distress cries. |
| 3-aminopyridine | 300<X<500 | Nervous. |
| 2-aminopyridine | 100<X<300 | Do. |
| 2,6-diaminopyridine | X>1,000 | Do. |
| 2,4,6-triaminopyridine | 500<X<1,000 | Droopy. |
| 4-amino-3-methylpyridine | 100<X<150 | Some convulsions and cries. |
| 4-amino-2-methylpyridine | X≅300 | Convulsions. |
| 4-amino-2,6-dimethylpyridine | 300<X<500 | Droopy, shaky. |
| 4-amino-2,5-dimethylpyridine | 100<X<500 | Shaky, some cries. |
| 3-amino-2,4,6-trimethylpyridine | 500<X<1,000 | Droopy. |
| 4-aminoquinaldine | 100<X<300 | Do. |
| 4-aminopyridine hydrochloride | 25<X<30 | Distress calls, tremors. |

COMPARATIVE RUNS

| Compound | LD$_{50}$, mg./kg.=X | Observed effects |
|---|---|---|
| Pyridine | X>1,000 | No effect. |
| 4-hydrazinopyridine-N-oxide | X>1,000 | Do. |
| 2,4-dimethylpyridine | X>1,000 | Do. |

EXAMPLE II

In a further series of runs, starlings were treated with some of the chemicals tested in Example I. In these runs, a measured dose of the chemical in water was forced into the stomach by means of a tuberculin syringe. The results of these tests are expressed as Table II. In the table, the numbers for intensity of reaction; 0—no reaction, 1—slight, 2—noticeable, 3—conspicuous and 4—violent.

Table II

| Chemical | Dosage, mg./kg. | Tremors | Loss of flight | Fluttering | Weakness | Loss of awareness | Voice | Minutes to reaction |
|---|---|---|---|---|---|---|---|---|
| 4-aminopyridine | 19 | 2 | 3 | 1 | 3 | 3 | 1 | 1:23 |
| Do | 20 | 1 | 3 | 2 | 1 | 2 | 2 | 1:30 |
| Do | 36 | 3 | 3 | 4 | 3 | 4 | 1 | :53 |
| Do | 39 | 2 | 3 | 4 | 2 | 4 | 1 | :23 |
| 4-aminopyridine-N-oxide | 35 | 1 | 2 | 1 | 1 | 1 | 2 | :25 |
| Do | 40 | 1 | 0 | 0 | 1 | 1 | 1 | :37 |
| Do | 60 | 4 | 4 | 3 | 3 | 4 | 4 | :14 |
| Do | 64 | 3 | 4 | 4 | 3 | 4 | 4 | :22 |
| Do | 75 | 3 | 3 | 4 | 3 | 4 | 3 | :11 |
| Do | 90 | 3 | 3 | 3 | 3 | 4 | 2 | :12 |
| 3-aminopyridine | 125 | 0 | 0 | 0 | 0 | 1 | 0 | :07 |
| Do | 135 | 0 | 0 | 0 | 0 | 1 | 0 | :07 |
| Do | 175 | 1 | 0 | 0 | 1 | 2 | 0 | :08 |
| Do | 185 | 1 | 0 | 0 | 1 | 2 | 1 | :06 |
| Do | 220 | 4 | 3 | 3 | 1 | 4 | 4 | :6 |
| Do | 225 | 3 | 4 | 4 | 2 | 4 | 4 | :03 |
| Do | 230 | 2 | 0 | 0 | 1 | 1 | 1 | :9 |
| Do | 245 | 3 | 4 | 4 | 2 | 4 | 4 | :05 |
| Do | 425 | 4 | 3 | 3 | 3 | 4 | 1 | :2 |
| Do | 530 | 4 | 3 | 3 | 3 | 4 | 1 | :3 |
| 2-aminopyridine | 187 | 3 | 3 | 4 | 2 | 4 | 4 | :06 |
| Do | 192 | 3 | 3 | 3 | 3 | 4 | 4 | :10 |
| Do | 238 | 3 | 3 | 3 | 2 | 4 | 3 | :07 |
| Do | 240 | 3 | 3 | 4 | 2 | 4 | 4 | :08 |
| 4-amino-3-methylpyridine | 55 | 4 | 4 | 4 | 2 | 3 | 4 | :19 |
| Do | 55 | 4 | 4 | 4 | 3 | 4 | 2 | :18 |
| Do | 59 | 2 | 3 | 2 | 1 | 4 | 1 | :10 |
| Do | 71 | 2 | 3 | 2 | 2 | 4 | 2 | :10 |
| Do | 115 | 4 | 4 | 4 | 2 | 4 | 4 | :07 |
| Do | 118 | 4 | 4 | 4 | 2 | 4 | 4 | :07 |

EXAMPLE III

A chick feeder containing 50 grams of untreated white sorghum and another chick feeder containing 50 grams of treated white sorghum were offered to cowbirds in one cage and pigeons in another cage on a free choice basis. The treated food was prepared by impregnating the grain with a 10% by weight solution of 4-aminopyridine-N-oxide in acetone and thereafter evaporating off the solvent.

In one test, involving pigeons and grain containing 1 percent by weight of the agent, two out of three pigeons were dead within four hours after placing the treated grain in the feeder. All three pigeons exhibited convulsions, tremors and the like. Similar results were obtained on pigeons with grain containing 0.5% by weight 4-aminopyridine-N-oxide except that only one pigeon out of four was dead after four hours.

In a test on cowbirds using 0.5% of the agent on the grain, one cowbird out of four was dead after 4 hours. All of the cowbirds experienced convulsions and emitted cries.

EXAMPLE IV

To determine possible secondary poisoning effects of 4-aminopyridine hydrochloride, a group of sparrows were each fed 10 grains of kaffir corn containing 0.78% by weight of this compound. This amount is about 20 times the $LD_{50}$ for sparrows. A cat was fed 51 of the convulsing sparrows over a five-day period, and no apparent ill effects on the cat were noted.

EXAMPLE V

Pans of corn chops, red sorghum and white sorghum which had been treated with an acetone solution of 4-aminopyridine were set out in a location heavily frequented by pigeons. The amount of solution used was such that the grain, after evaporation of the solvent, contained 1 percent by weight of the bird management agent.

The estimated pigeon population was 140–150 at the time the treated grain was set out. One day later, the number of pigeons in the area was 85 and after 3 more days, the number frequenting the area was down to 30. Many pigeons were observed during the three day period to have convulsions and were unable to fly.

EXAMPLE VI

A series of cage tests were carried out in which either ringbill or herring gulls were given water solutions of salts of 3-aminopyridine by means of a tuberculin syringe which forced the solution into the stomach. The time to the first reaction was noted, and the effects of the chemicals on the birds were observed. These results are expressed below in table form.

*Table III*

| Gull type | Chemical used | Dosage used | Time to 1st reaction minutes | Effects |
|---|---|---|---|---|
| Ringbill | 3-aminopyridine acetate | 2 drops of 50% aqueous (50 mg.) | 5 | Violent convulsion, recovered. |
| Herring | do | 4 drops of 50% aqueous (100 mg.) | 7 | Violent convulsion, recovered in 42 minutes. |
| Do | do | 5 drops of 50% aqueous (125 mg.) | 2 | Violent convulsion, died in 4 minutes. |
| Do | di(3-aminopyridinium) tartrate | 8 drops of 33% aqueous (120 mg.) | 10 | Convulsion, death. |
| Do | do | 12 drops of 33% aqueous (180 mg.) | 7 | Do. |

EXAMPLE VII

Grain which had been impregnated with 4-aminopyridinium chloride in an amount sufficient to provide 0.025 weight percent 4-aminopyridine based on the grain was distributed about the main campus of a large university. The estimated population of sparrows in this area at the time the grain was put out was 450–550 birds. Following the distribution of grain in January, sparrows practically disappeared at these locations until the first week of May when young birds appeared. The estimated population at this time was 80–85 birds, and by June this number had declined appreciably.

EXAMPLE VIII

Baits which had been treated with the bird management chemicals of this invention were distributed at a Florida airport which had a heavy population of gulls.

In one test, 5 bread baits, prepared by applying a solution of 94.8 mg. of 3-aminopyridine dihydrochloride to each bread bait, were distributed along the airport runway at a time when an estimated 200 gulls were in the area. Shortly after distributing the baits, 5 gulls were seen experiencing convulsions. The entire flock left the area. One dead gull was found on the runway.

In another test, 5 baits were prepared by charging 40 mg. 3-aminopyridine and 120 mg. of 4-aminopyridine to an open end capsule which was then plugged with bread. The plugged capsules were then covered with bread, after which the baits were distributed along the airport runway on a morning when an estimated 4500 gulls were present in the area. One gull was seen experiencing violent convulsions, and shortly thereafter, the entire flock left the area. The affected gull died.

EXAMPLE IX

A 3-week test was carried out using bird management chemicals to reduce the number of birds, principally pigeons and sparrows, in an area around a grain elevator in Texas. After 3 weeks, the bird population was reduced from 100–200 pigeons and upwards of 1000 sparrows to 4–12 pigeons and practically no sparrows. Grain which had been impregnated with an aqueous solution of 4-aminopyridinium chloride in an amount sufficient to provide 1.0 weight percent 4-aminopyridine was distributed in the area to wipe out the few remaining pigeons. At this concentration, the mortality rate is extremely high. Four dead pigeons and nine dead sparrows were picked up by noon the next day. This area has since remained practically free of birds.

EXAMPLE X

Grain, including corn, sorghum and oats is impregnated with an aqueous solution of di(4-aminopyridinium) sulfate in an amount sufficient to provide 0.5 percent by weight of 4-aminopyridine based on the grain. This grain is then distributed in an area frequented by feeding pigeons, starlings, sparrows, cowbirds and grackles. Birds ingesting the treated grain are soon affected, as evidenced by convulsions and warning cries. These effects serve to drive the other birds from the area.

As will be evident to those skilled in the art many variations and modifications of this invention can be practiced in view of the foregoing disclosure. Such variations and modifications are believed to come within the spirit and scope of the invention.

We claim:

1. A method for reducing the number of live birds in an area which comprises causing at least one of the birds in said area to ingest from 3 to 500 mg. of a bird management agent per kg. of bird weight, said bird management agent being a heterocyclic nitrogen-containing compound having a structural formula selected from the group consisting of

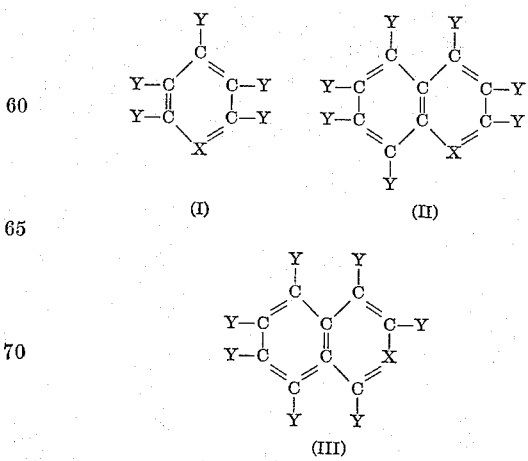

and salts thereof, wherein:

(1) X is selected from the group consisting of

and —N=,
(2) $n$ is 0 through 2,
(3) Y is selected from the group consisting of R and

wherein R is selected from the group consisting of hydrogen, methyl and ethyl, and wherein at least one

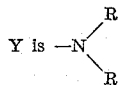

and
(4) said salts are selected from the group consisting of chloride, bromide, iodide, fluoride, nitrate, sulfate, phosphate, nitrite, acetate, propionate, butyrate, oxalate, malonate, succinate, tartrate, phthalate, benzoate, and citrate.

2. A method for reducing the number of live birds in an area which comprises placing in said area a bird food containing from 0.01 to 10 weight percent, based on said food, of a heterocyclic nitrogen-containing compound as defined in claim 1.

3. A method according to claim 2 wherein the birds are first attracted into said area with bait.

4. A bird management composition comprising a bird food containing from 0.01 to 10 percent by weight, based on said food, of a heterocyclic nitrogen-containing compound having a structural formula selected from the group consisting of

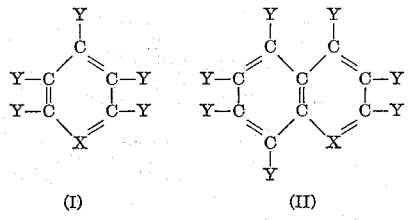

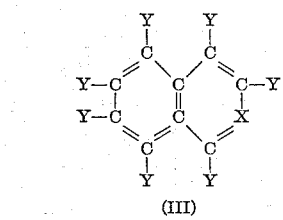

and salts thereof, wherein:

(1) X is selected from the group consisting of

and —N=,
(2) $n$ is 0 through 2,
(3) Y is selected from the group consisting of R and

wherein R is selected from the group consisting of hydrogen, methyl and ethyl, and wherein at least one

and
(4) said salts are selected from the group consisting of chloride, bromide, iodide, fluoride, nitrate, sulfate, phosphate, nitrite, acetate, propionate, butyrate, oxalate, malonate, succinate, tartrate, phthalate, benzoate, and citrate.

5. A bird management composition according to claim 4 which comprises a grain, as said food, impregnated from 0.02 to 2 weight percent, based on said grain, of a heterocyclic nitrogen-containing compound as defined.

6. A bird management composition comprising a bird food containing from 0.01 to 10 percent by weight, based on said food, of 4-aminopyridine.

7. A bird management composition comprising a bird food containing from 0.01 to 10 percent by weight, based on said food, of 3-aminopyridine.

8. A bird management composition comprising a bird food containing from 0.01 to 10 percent by weight, based on said food, of 2-aminopyridine.

9. A bird management composition comprising a bird food containing from 0.01 to 10 percent by weight, based on said food, of 4-aminopyridinium chloride.

10. A bird management composition comprising a bird food containing from 0.01 to 10 percent by weight, based on said food, of 3-aminopyridine dihydrochloride.

11. A bird management composition comprising a bird food containing from 0.01 to 10 percent by weight, based on said food, of 4-amino-3-picoline-N-oxide.

12. A bird management composition comprising a bird food containing from 0.01 to 10 weight percent by weight, based on said food, of 4-aminopyridine-N-oxide.

13. A bird management composition comprising grain impregnated with from 0.02 to 2 weight percent, based on said grain, of 4-aminopyridinium hydrochloride.

14. A bird management composition comprising grain impregnated with from 0.02 to 2 weight percent, based on said grain, of 4-aminopyridine.

References Cited in the file of this patent
UNITED STATES PATENTS
3,044,930   Goodhue et al. _____ July 17, 1962